United States Patent
Deng et al.

(10) Patent No.: US 11,879,468 B2
(45) Date of Patent: Jan. 23, 2024

(54) CONTROL METHOD FOR CENTRIFUGAL COMPRESSOR AND AIR CONDITIONING SYSTEM

(71) Applicant: Carrier Corporation, Palm Beach Gardens, FL (US)

(72) Inventors: Kai Deng, Shanghai (CN); Vishnu Sishtla, Palm Beach Gardens, FL (US); Jun Cao, Shanghai (CN); Yuchang Shac, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/837,554

(22) Filed: Jun. 10, 2022

(65) Prior Publication Data
US 2022/0403849 A1   Dec. 22, 2022

(30) Foreign Application Priority Data

Jun. 17, 2021  (CN) .......................... 202110672449.2

(51) Int. Cl.
  *F04D 27/02* (2006.01)
  *F04D 17/10* (2006.01)
  *F04D 27/00* (2006.01)

(52) U.S. Cl.
  CPC ........... *F04D 17/10* (2013.01); *F04D 27/004* (2013.01); *F04D 27/0246* (2013.01); *F04D 27/0261* (2013.01); *F04D 27/0253* (2013.01); *F05D 2250/51* (2013.01)

(58) Field of Classification Search
  CPC .. F04D 27/0246; F04D 27/0261; F04D 27/02; F04D 27/0253
  See application file for complete search history.

(56) References Cited

U.S. PATENT DOCUMENTS

| | | |
|---|---|---|
| 4,151,725 A | 5/1979 | Kountz |
| 4,546,618 A | 10/1985 | Kountz et al. |
| 4,686,834 A | 8/1987 | Haley et al. |
| 5,355,691 A | 10/1994 | Sullivan et al. |
| 5,553,997 A | 9/1996 | Goshaw et al. |
| 5,669,225 A | 9/1997 | Beaverson et al. |
| 5,947,680 A * | 9/1999 | Harada ................. F04D 29/462 415/36 |

(Continued)

FOREIGN PATENT DOCUMENTS

| | | |
|---|---|---|
| CN | 101952601 B | 6/2013 |
| CN | 101995126 B | 11/2014 |

(Continued)

*Primary Examiner* — Woody A Lee, Jr.
*Assistant Examiner* — Behnoush Haghighian
(74) *Attorney, Agent, or Firm* — CANTOR COLBURN LLP

(57) ABSTRACT

A control method for a centrifugal compressor and an air conditioning system. The control method for the centrifugal compressor includes: S100, when an inlet opening of the centrifugal compressor is below a first preset value, shutting down a drive motor of the centrifugal compressor; or S200, when the inlet opening of the centrifugal compressor is not below the first preset value, performing the following operations in a preset order: decreasing the inlet opening of the centrifugal compressor, and increasing a rotate speed of the centrifugal compressor.

12 Claims, 1 Drawing Sheet

(56) References Cited

U.S. PATENT DOCUMENTS

| | | | |
|---|---|---|---|
| 7,300,257 B2 * | 11/2007 | Lifson | F04C 28/04 |
| | | | 418/55.6 |
| 7,856,834 B2 | 12/2010 | Haley | |
| 9,175,691 B2 | 11/2015 | Stanko et al. | |
| 9,677,566 B2 | 6/2017 | Sishta | |
| 9,797,640 B2 | 10/2017 | Umeda et al. | |
| 10,113,553 B2 | 10/2018 | Umeda et al. | |
| 10,280,928 B2 | 5/2019 | Hossain et al. | |
| 10,330,106 B2 | 6/2019 | Hossain et al. | |
| 10,364,826 B2 | 7/2019 | Sishtla | |
| 10,544,791 B2 | 1/2020 | De | |
| 10,563,673 B2 | 2/2020 | Umeda et al. | |
| 10,612,827 B2 | 4/2020 | Sibik | |
| 10,634,405 B2 | 4/2020 | Sibik | |
| 11,531,307 B2 * | 12/2022 | Snell | F04D 29/462 |
| 2006/0222510 A1 * | 10/2006 | Lifson | F04C 28/04 |
| | | | 417/53 |
| 2014/0064948 A1 | 3/2014 | Husted et al. | |
| 2021/0102720 A1 * | 4/2021 | Snell | F04D 27/0253 |
| 2022/0120486 A1 * | 4/2022 | Kim | F25B 49/022 |

FOREIGN PATENT DOCUMENTS

| | | | |
|---|---|---|---|
| CN | 105074360 A | 11/2015 | |
| CN | 104220822 B | 8/2016 | |
| CN | 104704243 B | 9/2016 | |
| CN | 108026932 A | 5/2018 | |
| CN | 108138791 B | 11/2020 | |
| CN | 108431522 B | 11/2020 | |
| CN | 112074693 A | 12/2020 | |
| CN | 108826775 B | 1/2021 | |

* cited by examiner

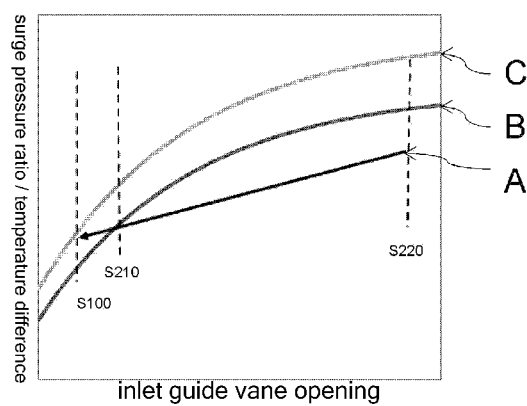

CONTROL METHOD FOR CENTRIFUGAL COMPRESSOR AND AIR CONDITIONING SYSTEM

FOREIGN PRIORITY

This application claims priority to Chinese Patent Application No. 202110672449.2, filed Jun. 17, 2021, and all the benefits accruing therefrom under 35 U.S.C. § 119, the contents of which in its entirety are herein incorporated by reference.

TECHNICAL FIELD OF INVENTION

The present application relates to the field of air conditioning, and more specifically, to the control method for a centrifugal compressor in an air conditioning system.

BACKGROUND OF THE INVENTION

Currently, refrigeration systems and associated equipment have found wide application in a variety of temperature control fields including home air conditioning, commercial air conditioning, cold-chain transportation, low-temperature preservation, and the like. Among these fields, for application scenarios such as freezing and refrigerating, and low-temperature environment laboratories, or the like, which require lower evaporating temperature and larger cooling capacity, large refrigeration equipment are generally needed. Centrifugal compressors are commonly used power source components in large refrigeration systems for compressing the gas phase refrigerant within the system, thereby the refrigerant is converted from a low pressure state to a high pressure state, and subsequently participates in a condensation, throttling, and evaporation process.

However, for existing refrigeration systems that employ centrifugal compressors, the robustness of centrifugal compressor's own parts is highly challenged. For example, when the system stops running, the drive motor of the centrifugal compressor is turned off, at which time, due to the absence of the large pressure difference provided by the centrifugal compressor, it may cause the refrigerant in the condenser to flow back to the centrifugal compressor, thereby causing the compressor to reverse, generating significant noise and impinging the rotor bearings of the compressor. As another example, for another system, when it stops running, the centrifugal compressor first decreases the rotate speed of the drive motor and then, when the rotate speed is decreased to some extent, closes the inlet guide vanes of the compressor, at which point the compressor may experience surge.

SUMMARY OF THE INVENTION

The present application intended to provide a control method for a centrifugal compressor and an air conditioning system to at least partially address or mitigate problems existing in the prior art.

To achieve at least one object of the present application, according to one aspect of the present application, there is provided a control method for a centrifugal compressor, the method comprises: S100, when an inlet opening of the centrifugal compressor is below a first preset value, shutting down a drive motor of the centrifugal compressor; or S200, when the inlet opening of the centrifugal compressor is not below the first preset value, performing the following operations in a preset order: decreasing the inlet opening of the centrifugal compressor, and increasing a rotate speed of the centrifugal compressor.

In addition to or as an alternative of one or more of the above features, in other embodiments, step S200 comprises: S210, when the inlet opening of the centrifugal compressor is not below the first preset value but below a second preset value, the preset order being: increasing the rotate speed of the centrifugal compressor, and decreasing the inlet opening of the centrifugal compressor to the first preset value subsequently or simultaneously; or S220, when the inlet opening of the centrifugal compressor is not below the second preset value, the preset order being: decreasing the inlet opening of the centrifugal compressor to the second preset value first, and then performing S210.

In addition to or as an alternative of one or more of the above features, in other embodiments, the first preset value is 10% of a full inlet opening; and/or the second preset value is 30% of the full inlet opening.

In addition to or as an alternative of one or more of the above features, in other embodiments, the rotate speed of the centrifugal compressor is controlled by adjusting an output power of the drive motor of the centrifugal compressor.

In addition to or as an alternative of one or more of the above features, in other embodiments, an output current is adjusted to 60%-65% of a full-load current to control the output power of the drive motor of the centrifugal compressor.

In addition to or as an alternative of one or more of the above features, in other embodiments, the inlet opening of the centrifugal compressor is adjusted by adjusting inlet guide vanes of the centrifugal compressor.

In addition to or as an alternative of one or more of the above features, in other embodiments, the operation of increasing the rotate speed of the centrifugal compressor in step S200 comprises: dynamically decreasing acceleration of the increasing rotate speed of the centrifugal compressor to 0 as the inlet opening of the centrifugal compressor decreases.

To achieve at least one object of the present application, according to one aspect of the present application, there is provided an air conditioning system, the system comprises: a centrifugal compressor for compressing refrigerant within the air conditioning system; an opening sensor for acquiring an inlet opening of the centrifugal compressor; and a controller configured to perform the following, based on the inlet opening of the centrifugal compressor acquired by the opening sensor: when the inlet opening of the centrifugal compressor is below a first preset value, shutting down a drive motor of the centrifugal compressor; or when the inlet opening of the centrifugal compressor is not below the first preset value, performing the following operations in a preset order: decreasing the inlet opening of the centrifugal compressor, and increasing a rotate speed of the centrifugal compressor.

In addition to or as an alternative of one or more of the above features, in other embodiments, the controller is further configured to perform: when the inlet opening of the centrifugal compressor is not below the first preset value but below a second preset value, the preset order is: increasing the rotate speed of the centrifugal compressor, and decreasing the inlet opening of the centrifugal compressor to the first preset value subsequently or simultaneously; or when the inlet opening of the centrifugal compressor is not below the second preset value, the preset order is: decreasing the inlet opening of the centrifugal compressor to the second preset value first, and then performing S210.

In addition to or as an alternative of one or more of the above features, in other embodiments, the first preset value is 10% of a full inlet opening; and/or the second preset value is 30% of the full inlet opening.

In addition to or as an alternative of one or more of the above features, in other embodiments, the controller is further configured to adjust an output power of the drive motor of the centrifugal compressor to control the rotate speed of the centrifugal compressor.

In addition to or as an alternative of one or more of the above features, in other embodiments, the controller is further configured to adjust an output current to 60%-65% of a full-load current to adjust the output power of the drive motor of the centrifugal compressor.

In addition to or as an alternative of one or more of the above features, in other embodiments, the centrifugal compressor further comprises inlet guide vanes; wherein the controller is further configured to adjust the inlet opening of the centrifugal compressor by adjusting the inlet guide vanes.

In addition to or as an alternative of one or more of the above features, in other embodiments, the controller is further configured to perform: dynamically decrease acceleration of the increasing rotate speed of the centrifugal compressor to 0 as the inlet opening of the centrifugal compressor decreases during the process of increasing the rotate speed of the centrifugal compressor.

According to the control method of the centrifugal compressor of the present application, by grading the inlet opening of the centrifugal compressor, the drive motor of the centrifugal compressor is turned off directly only at a smaller opening. At this point, due to the smaller opening, the degree of the backflow of refrigerant generated by the condenser is limited, thereby not causing the compressor to violently reverse or generate severe vibration and noise. Further, when the inlet opening of the centrifugal compressor is larger, the problems of the backflow and the surge are avoided at the same time by decreasing the inlet opening and increasing the rotate speed of the centrifugal compressor. Thereby, air conditioning systems employing such method have higher reliability, longer lifetime, and lower noise.

BRIEF DESCRIPTION OF THE DRAWINGS

FIG. 1 is a schematic diagram of a parameter change in the shutdown process of an air conditioning system according to one embodiment of the control method for the centrifugal compressor of the present application.

DETAILED DESCRIPTION OF THE INVENTION

The present application will be described in detail below with reference to exemplary embodiments in the figures. It should be understood, however, that the present application may be implemented in many different forms and should not be construed as limited to the embodiments set forth herein. These embodiments provided here intend to make the disclosure of the application more complete and elaborate, and to fully convey the concepts of the application to those skilled in the art.

Furthermore, for any single technical feature described or implied in the embodiments mentioned herein, or any single technical feature shown or implied in the various FIGURES, the present application still allows for any combination between or deletion of these technical features (or their equivalents) without any technical obstacles, thereby obtaining more other embodiments of the present application that may not be directly referred to herein.

Moreover, the term "surge envelope" mentioned herein is a fitting curve to evaluate the compressor surge risk based on several parameters associated with compressor surge. For example, in combination with FIG. 1, curves B and C in the FIGURE are "surge envelope". The abscissa in the FIGURE refers to the change process of surge envelope as the opening of inlet guide vane changes, while the ordinate refers to several key parameters that affect the occurrence of surge, such as surge pressure ratio, that is, the ratio of the measured refrigerant pressure in the condenser to the measured refrigerant pressure in the evaporator in the system; Another example is the surge temperature difference, that is, the difference between the saturation temperature in the condenser and the saturation temperature in the evaporator in the system. The above parameters measure the surge from different angles, so they can be used to fit the surge envelope.

One embodiment of the air conditioning system of the present application will be described first below. The air conditioning system may comprise conventional refrigeration components such as the compressor, the condenser, the throttle element, the evaporator, etc., to achieve fundamental functions of refrigeration, heating, and the like, by compressing the refrigerant, condensing the refrigerant to dissipate heat, throttling expanding the refrigerant, and making the refrigerant evaporate to absorb heat; the air conditioning system may also comprise functional components such as the economizer, the gas-liquid separator, the four-way valve, and the like, to additionally perform improved functions of increasing enthalpy, separation, commutation, and the like. For the air conditioning system referred to in the embodiment, its compressor should be selected as the centrifugal compressor, and it is configured with acquisition parameters for controlling the employed opening sensor (e.g., guide vane sensor) and the controller (e.g., a microprocessor-based controller) implementing the control logic. Wherein, the opening sensor may be used to acquire the inlet opening of the centrifugal compressor; and the controller may be configured to perform the control method for the centrifugal compressor based on the inlet opening of the centrifugal compressor obtained by the opening sensor.

Specifically, the control method implemented includes the steps of: step S100: shutting down the drive motor of the centrifugal compressor in case that the inlet opening of the centrifugal compressor is below a first preset value. At this point, because the inlet opening of the centrifugal compressor is relatively small, the degree of the backflow of refrigerant generated by the condenser is limited and therefore does not result in violent reverse of the rotor of the centrifugal compressor or generate severe vibration and noise. Or, step S200: performing the following operations in a preset order in case that the inlet opening of the centrifugal compressor is not below the first preset value: decrease the inlet opening of the centrifugal compressor, and increase the rotate speed of the centrifugal compressor. At this point, because the inlet opening of the centrifugal compressor is larger, the problem of the backflow may be avoided by decreasing the inlet opening, and the problem of surge may also be avoided by increasing the rotate speed of the centrifugal compressor.

Under such an arrangement, by employing the described control method of the centrifugal compressor, the air conditioning system of the foregoing embodiments grades the inlet opening of the centrifugal compressor, and provides different shutdown steps based on different degrees of inlet openings, achieving smooth and steady shutdown of the centrifugal compressor while decreasing backflow and noise, and avoiding damage of the rotor bearing, and the like. Thereby, the air conditioning system employing this method has higher reliability, longer lifespan, and provides better user experiences.

Wherein, with respect to the air conditioning system proposed in the context of the present application, it should be appreciated by those skilled in the art that it does not narrowly refer to the air conditioners in the industry for use in the buildings and have indoor cooling/heating units and outdoor heat exchanging units. Instead, it should be appreciated as a type of thermodynamic system having the function of implementing air conditioning, which achieves heat exchange with the air at the location to be conditioned by the phase change of refrigerant within the system under the drive of various kinds of power sources (e.g., electrical power). For example, when the air conditioning system is used for heating, ventilation, and air conditioning of the building, it may be a refrigerating system with a single cooling function, and may also be a heat pump system with both cooling and heating capacities. As another example, when the air conditioning system is used in the cold-chain field, it may be a transport refrigeration system or a refrigerating/freezing system. However, regardless of the specific form of the air conditioning system, there should be a centrifugal compressor to make it suitable for using the control method about the centrifugal compressor in the concept of the application.

Further modifications of the control method for the centrifugal compressor and corresponding modifications of the air conditioning system on the structural arrangement for further improving its operating efficiency, reliability, or for improvement considerations in other aspects will be described below by way of exemplary illustration.

For example, as a refinement to the control process of step S200, it may further comprise subdividing the opening of the inlet of the centrifugal compressor into being not below a first preset value and being not below a second preset value, and performing steps of control based on the subdivided inlet opening range as follows. Wherein, S210 relates to operation in the case where the inlet opening of the centrifugal compressor is not below the first preset value but below the second preset value. At this point, the preset order of the control operations mentioned in the preceding embodiments is to increase the rotate speed of the centrifugal compressor based on the surge envelope first. At this point, since the inlet opening of the centrifugal compressor remains constant and the rotate speed increases, the corresponding surge threshold on the surge envelope also increases, making the surge problem less likely to happen. The inlet opening of the centrifugal compressor is then decreased to the first preset value. At this point, as the inlet opening of the centrifugal compressor decreases, the degree of the backflow of refrigerant generated by the condenser is limited, and therefore does not result in violent reverse of the rotor of the centrifugal compressor or generate severe vibration and noise. Meanwhile, since the surge envelope forming the surge threshold undergoes overall raise previously with increasing rotate speed, therefore the surge threshold would not be reached even when the inlet opening of the centrifugal compressor decreases, avoiding surge problems all the way.

Similarly, the rotate speed of the centrifugal compressor may be increased and the inlet opening of the centrifugal compressor may be decreased to a first preset value concurrently based on the surge envelope as well. As the rotate speed of the centrifugal compressor increases, the corresponding surge threshold on the surge envelope may be quickly increased; thus, it may also make the surge problems less likely to happen when decreasing the inlet opening of the centrifugal compressor concurrently. Accordingly, since the foregoing control steps are performed simultaneously, the time corresponding to the control process may be saved. Since the probability of occurrence of the surge event also increases as the duration of time increases, the modification of this control step also facilitates avoiding surge problems.

Further, S220 relates to the operation in the case where the inlet opening of the centrifugal compressor is not below a second preset value. At this point, the preset order of the control operations mentioned in the preceding embodiments is to decrease the inlet opening of the centrifugal compressor to the second preset value. At this stage, since the inlet opening of the centrifugal compressor is relatively large, taking into account that the corresponding surge threshold on the surge envelope is higher and generally not readily reached, the operation to increase the rotate speed of the compressor is not performed ahead, but choose to decrease the inlet opening of the centrifugal compressor directly to decrease the degree of backflow of the refrigerant generated by the condenser, thereby avoiding violent reverse of the rotor of the centrifugal compressor during this stage and generation of severe vibration and noise. One of the operation processes in the previous embodiments of step S210 is subsequently performed, i.e. may increase the rotate speed of the centrifugal compressor first, and then decrease the inlet opening of the centrifugal compressor to a first preset value or increase the rotate speed of the centrifugal compressor and decrease the inlet opening of the centrifugal compressor to a first preset value concurrently. Thereby, by raising the corresponding surge threshold on the surge envelope, the risk that the surge threshold is reached is to effectively avoided, making the surge problem less likely to happen.

As an application of the foregoing control method in a type of air conditioning system, definition and refinement may be made to its control parameters and control manners.

For example, the first preset value mentioned in the method may be 10% of the full inlet opening, while the second preset value mentioned may be 30% of the full inlet opening. And, the specific inlet opening control object may be the inlet guide vanes of the centrifugal compressor.

As another example, with respect to the control of the rotate speed of the centrifugal compressor, it may be achieved by adjusting the output power of the drive motor of the centrifugal compressor. More specifically, the output power of the drive motor of the centrifugal compressor may be controlled by adjusting the output current to 60%-65% of the full-load current.

As another example, during the foregoing operation process of increasing the rotate speed of the centrifugal compressor, for further refining the control method, control may be made to the value of the incremental change of the rotate speed. Specifically, when the opening is getting smaller and the rotate speed is getting faster, the surge event will become less likely to happen. Thus, during this process, the acceleration of the increasing rotate speed of the centrifugal compressor may also be dynamically decreased to 0 as the inlet opening of the centrifugal compressor decreases.

For the foregoing control method, as a complete closed loop for shutdown control of the centrifugal compressor in the air conditioning system, it may directly perform the step of S100 to complete the shutdown process under one type of operating condition; and may perform the steps of S200 and S100 in sequence to complete the shutdown process under another type of operating condition. For another more specific embodiment, it may perform the steps of S210 and S100 in sequence to complete the shutdown process under one type of operating condition; and may perform the steps of S220, S210 and S100 in sequence to complete the shutdown process under another type of operating condition.

One embodiment of the shutdown process of the centrifugal compressor of the air conditioning system employing the foregoing control method will be exemplarily described below in connection with FIG. 1. Wherein, straight line A indicates the surge lift and opening variation of the centrifugal compressor throughout the shutdown process; curve B indicates the surge envelope at the rotate speed of the centrifugal compressor while performing the shutdown operation; and curve C indicates the surge envelope after increasing the rotate speed of the centrifugal compressor.

Firstly, when a shutdown command is received at the controller of the air conditioning system, the centrifugal compressor is in a state of the right-most endpoint of the straight line A, which has the rotate speed and the inlet opening before shutdown. Since the inlet opening is not below the second preset value, at this point step S220 is performed, and the controller first controls the centrifugal compressor to decrease its inlet opening to the second preset value. Subsequently, perform S210: while decreasing the inlet opening of the centrifugal compressor to the first preset value, the controller begins to control the centrifugal compressor to increase the rotate speed such that the surge envelope for the system changes from curve B to curve C. At this point the centrifugal compressor moves from the point of intersection of the straight line A and curve B or from near the intersection to the state of the right-most endpoint of the straight line A, and it is still on the right side of curve C, with no risk of surge. At the same time, as the inlet opening of the centrifugal compressor decreases, the backflow of refrigerant generated by the condenser is limited, and therefore does not result in violent reverse of the rotor of the centrifugal compressor or severe vibration and noise. Subsequently, perform S100: when the inlet opening of the centrifugal compressor is below the first preset value, shutting down the drive motor of the centrifugal compressor, thereby completing a smooth and reliable shutdown process of the centrifugal compressor.

The above examples mainly illustrate the control method for the centrifugal compressor and air conditioning system of the present application. Although only some of the embodiments of the present application have been described herein, it will be appreciated by those of ordinary skill in the art that the present application may be implemented in many other forms without departing from its spirit and scope. Accordingly, the example and embodiments shown are to be considered as illustrative and not restrictive, and the application may encompass various modifications and substitutions without departing from the spirit and scope of the application as defined by the appended claims.

What is claimed is:

1. A control method for a centrifugal compressor, comprising:
   S100, when an inlet opening of the centrifugal compressor is below a first preset value, shutting down a drive motor of the centrifugal compressor; or
   S200, when the inlet opening of the centrifugal compressor is not below the first preset value, performing the following operations in a preset order: decreasing the inlet opening of the centrifugal compressor, and increasing a rotational speed of the centrifugal compressor;
   wherein step S200 comprises:
   S210, when the inlet opening of the centrifugal compressor is not below the first preset value but below a second preset value, the preset order being: increasing the rotational speed of the centrifugal compressor, and decreasing the inlet opening of the centrifugal compressor to the first preset value subsequently or simultaneously; or
   S220, when the inlet opening of the centrifugal compressor is not below the second preset value, the preset order being: decreasing the inlet opening of the centrifugal compressor to the second preset value first, and then performing S210.

2. The control method of claim 1, wherein the first preset value is 10% of a full inlet opening; and/or the second preset value is 30% of the full inlet opening.

3. The control method of claim 1, wherein the rotational speed of the centrifugal compressor is controlled by adjusting an output power of the drive motor of the centrifugal compressor.

4. The control method of claim 3, wherein an output current is adjusted to 60%-65% of a full-load current to control the output power of the drive motor of the centrifugal compressor.

5. The control method of claim 1, wherein the inlet opening of the centrifugal compressor is adjusted by adjusting inlet guide vanes of the centrifugal compressor.

6. A control method for a centrifugal compressor, comprising:
   S100, when an inlet opening of the centrifugal compressor is below a first preset value, shutting down a drive motor of the centrifugal compressor; or
   S200, when the inlet opening of the centrifugal compressor is not below the first preset value, performing the following operations in a preset order: decreasing the inlet opening of the centrifugal compressor, and increasing a rotational speed of the centrifugal compressor;
   wherein the operation of increasing the rotational speed of the centrifugal compressor in step S200 comprises: dynamically decreasing acceleration of the increasing rotational speed of the centrifugal compressor to 0 as the inlet opening of the centrifugal compressor decreases.

7. An air conditioning system, comprising:
   a centrifugal compressor for compressing refrigerant within the air conditioning system;
   an opening sensor for acquiring an inlet opening of the centrifugal compressor; and
   a controller configured to perform the following, based on the inlet opening of the centrifugal compressor acquired by the opening sensor:
   when the inlet opening of the centrifugal compressor is below a first preset value, shutting down a drive motor of the centrifugal compressor; or
   when the inlet opening of the centrifugal compressor is not below the first preset value, performing the following operations in a preset order: decreasing the inlet opening of the centrifugal compressor, and increasing a rotational speed of the centrifugal compressor;
   wherein the controller is further configured that: when the inlet opening of the centrifugal compressor is not below the first preset value but below a second preset value, the preset order is: increasing the rotational speed of the centrifugal compressor, and decreasing the inlet opening of the centrifugal compressor to the first preset value subsequently or simultaneously; or
   when the inlet opening of the centrifugal compressor is not below the second preset value, the preset order is: decreasing the inlet opening of the centrifugal compressor to the second preset value first, and then increasing the rotational speed of the centrifugal compressor, and decreasing the inlet opening of the centrifugal compressor to the first preset value subsequently or simultaneously.

8. The air conditioning system of claim 7, wherein the first preset value is 10% of a full inlet opening; and/or the second preset value is 30% of the full inlet opening.

9. The air conditioning system of claim 7, wherein the controller is further configured to adjust an output power of the drive motor of the centrifugal compressor to control the rotational speed of the centrifugal compressor.

10. The air conditioning system of claim 9, wherein the controller is further configured to adjust an output current to 60%-65% of a full-load current to adjust the output power of the drive motor of the centrifugal compressor.

11. The air conditioning system of claim 7, wherein the centrifugal compressor further comprises inlet guide vanes; wherein the controller is further configured to adjust the inlet opening of the centrifugal compressor by adjusting the inlet guide vanes.

12. An air conditioning system, comprising:
- a centrifugal compressor for compressing refrigerant within the air conditioning system;
- an opening sensor for acquiring an inlet opening of the centrifugal compressor; and
- a controller configured to perform the following, based on the inlet opening of the centrifugal compressor acquired by the opening sensor:
- when the inlet opening of the centrifugal compressor is below a first preset value, shutting down a drive motor of the centrifugal compressor; or
- when the inlet opening of the centrifugal compressor is not below the first preset value, performing the following operations in a preset order: decreasing the inlet opening of the centrifugal compressor, and increasing a rotational speed of the centrifugal compressor;
- wherein the controller is further configured to dynamically decrease acceleration of the increasing rotational speed of the centrifugal compressor to 0 as the inlet opening of the centrifugal compressor decreases during the process of increasing the rotational speed of the centrifugal compressor.

* * * * *

UNITED STATES PATENT AND TRADEMARK OFFICE
CERTIFICATE OF CORRECTION

PATENT NO. : 11,879,468 B2
APPLICATION NO. : 17/837554
DATED : January 23, 2024
INVENTOR(S) : Kai Deng et al.

It is certified that error appears in the above-identified patent and that said Letters Patent is hereby corrected as shown below:

On the Title Page

(72) Inventors: replace "Yuchang Shac" with --Yuchang Shao--

Signed and Sealed this
Twenty-third Day of April, 2024

Katherine Kelly Vidal
*Director of the United States Patent and Trademark Office*